United States Patent [19]

Harmsen et al.

[11] Patent Number: 5,309,864
[45] Date of Patent: May 10, 1994

[54] METHOD AND APPARATUS FOR FEEDING ANIMALS

[75] Inventors: Jan H. Harmsen, Hengelo; Anton Kuip, Groenlo, both of Netherlands

[73] Assignee: N.V. Nederlandsche Apparatenfabriek NEDAP, De Groenlo, Netherlands

[21] Appl. No.: 910,368

[22] PCT Filed: Nov. 12, 1991

[86] PCT No.: PCT/NL91/00228
§ 371 Date: Jul. 24, 1992
§ 102(e) Date: Jul. 24, 1992

[87] PCT Pub. No.: WO92/08344
PCT Pub. Date: May 29, 1992

[30] Foreign Application Priority Data
Nov. 12, 1990 [NL] Netherlands .................... 9002465

[51] Int. Cl.$^5$ ................................................ A01K 5/02
[52] U.S. Cl. ................................ 119/51.02; 119/57.6
[58] Field of Search ............................ 119/51.02, 57.6

[56] References Cited
U.S. PATENT DOCUMENTS
4,223,638 9/1980 Sappington et al. ............... 119/57.6
4,712,511 12/1987 Zamzow et al. .................... 119/51.02

FOREIGN PATENT DOCUMENTS
3033977 4/1982 Fed. Rep. of Germany .
WO80/01231 6/1980 PCT Int'l Appl. .
WO88/09119 12/1988 PCT Int'l Appl. .

Primary Examiner—Robert P. Swiatek

[57] ABSTRACT

A method and apparatus for feeding animals, particularly for feeding livestock, includes a plurality of individual feeding stalls (2) each having a feeding trough (24), a feed container (25), and a door (21) with a locking device (23). Feed is deposited in the troughs from the containers by operation of a flap (26) at the bottom of each container operated by a common operating device (27, 29). A shuttle feeding station (3) is movable along rails (12) to positions adjacent to each feeding stall and deposits feed therefrom into each feeding container. An identification label (50) is attached to each animal for generating a unique code for each animal in an electromagnetic interrogation field. A transmitter/receiver (37) on the feeding station generates an electromagnetic interrogation field and receives the unique code from each animal and transmits this identification to a computer (1) which has stored therein data relating to each unique code. After initial feeding in equal amounts, the shuttle feeding station is operated by the computer to deposit additional feed through a jack screw device (35, 36) into each feeding container in amounts depending upon the specific unique code for each animal.

19 Claims, 1 Drawing Sheet

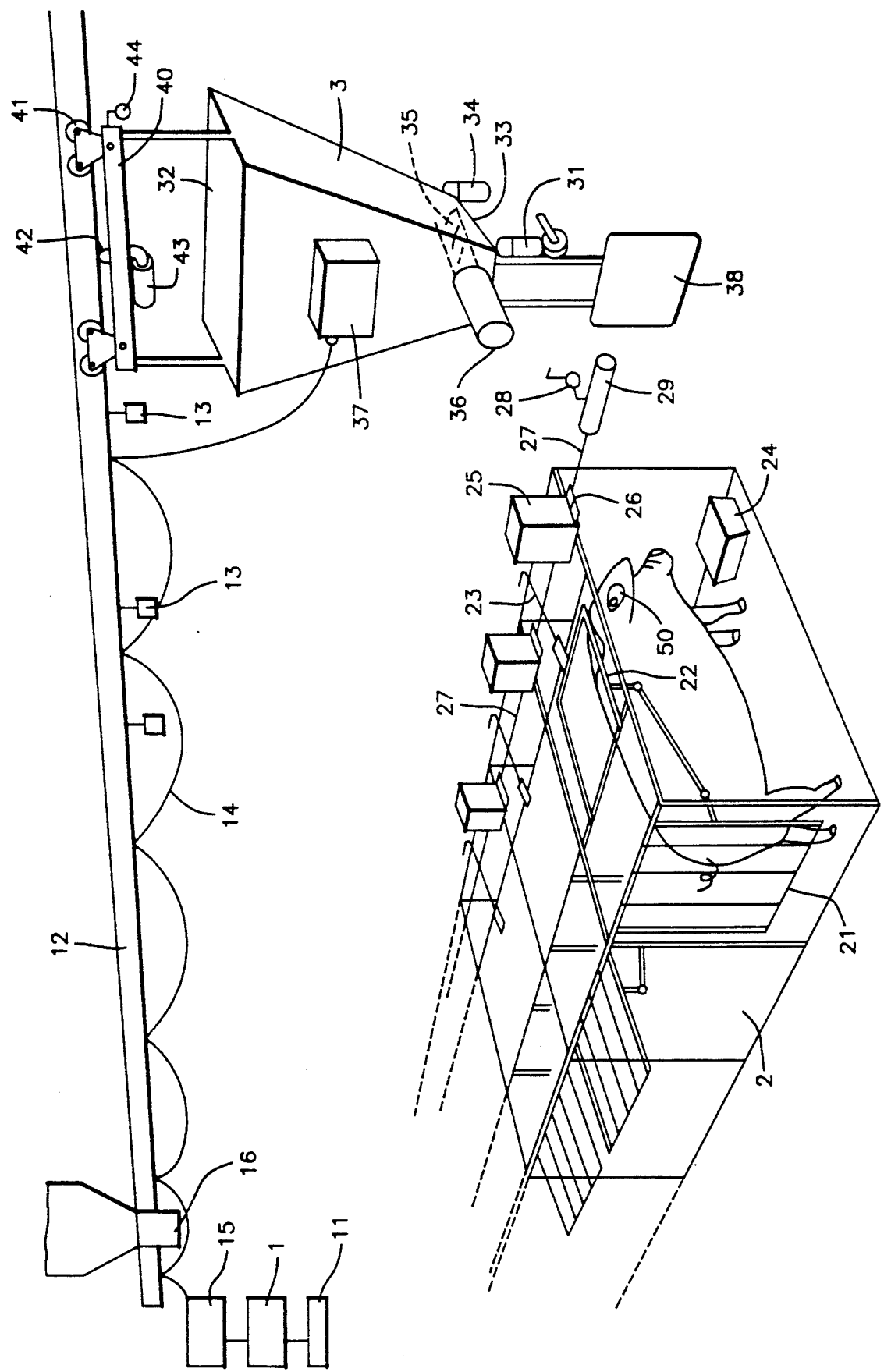

METHOD AND APPARATUS FOR FEEDING ANIMALS

BACKGROUND OF THE INVENTION

This invention relates to a method of feeding animals, suitable in particular for feeding livestock, in which the animal can freely move about and freely enter a plurality of feeding stalls, each animal carrying an electric responder which generates a unique code for each animal in an electromagnetic interrogation field.

The invention further relates to apparatus for carrying out this method.

In pig farming, a method for keeping pigs is known in which the pigs are tied up and remain permanently in the same place, except when they farrow down. In that case, they are isolated in a so-called farrowing pen, where they stay until the piglets are big enough and the sows are taken back to their fixed place where they are tied up again.

Such a method has an adverse effect on the well-being of the animals, which in turn might lead to unfavorable farm-economic results. Being tied up in small spaces with limited space to lie in, the animals have little opportunity to move which causes stress, abnormal behavior and diseases of the legs of the animals. Further, with such a housing method, it is very difficult to realize computer-controlled feeding of the animals, particularly if several kinds of feed must be dosed.

According to a variant of the above-mentioned method, use is made of feeding cubicles where the animals are not tied up but permanently locked up in a small space. Here, similar problems are encountered. Sometimes in this system the animals can occasionally move about freely. In that case, feeding the animals individually is a problem because they do not always return to the same cubicle. In this known system, too, it is therefore troublesome to implement automation by means of a computer.

Another known method of keeping livestock is the method of group housing, where the animals, e.g. pigs, can move about freely in the housing space. Here, automatic, individual feeding has been rendered possible by arranging a feeding station in the space where the animals are housed, which is connected to a computer, in which is stored the amount of feed allowed to each pig and by making each animal electronically identifiable. Upon entering a feeding stall, a pig is electronically identified by means of an electronic identification label which it carries about its neck or is attached to an ear, and is read by a transmitter/receiver. The information is transmitted to the computer, whereupon the computer reports the amount of feed to be allotted to the animal identified. The transmitter/receiver controls one or more jackscrew motors which cause the feed to drop into the feeding through in front of the snout of the pig.

Although this method yields a considerable improvement of the well-being of the animals and enables automation of the feed supply by means of a computer, there are still some disadvantages to be noted in some situations. It is troublesome to isolate animals from the group and to check them since they are moving around freely. Further, in a small group, pecking order fights tend to occur at the feeding station, which may involve vulva biting.

BRIEF SUMMARY OF THE INVENTION

It is an object of the present invention to combine the advantages of the tying-up system, i.e., simple checking of the animals and simple isolation of an individual animal from the group, with the advantages of group housing, i.e., greater well-being of the animals owing to their being allowed to move about freely, and the possibility of automatically feeding an individual animal by means of a computer.

To that end, according to the invention, a method of feeding animals of the type described hereinabove is characterized in that for the feed supply, use is made of a feeding station moving along the feeding stalls, the feeding station comprising a transmitter/receiver for generating an electromagnetic interrogation field adjacent to each feeding stall and identifying an animal that is present in the feeding stall; that with each feed supply, the feed is furnished in two portions, the first portion being of the same amount for all animals and being made available in all feeding stalls simultaneously, while the second portion is determined for each animal individually on the basis of the unique code generated by the electronic responder of the animal in question and the data associated with that code, stored in a central computer. By utilizing the invention, the disadvantages of the tying-up system, such as stress, etc., as a result of limited room to move, are eliminated in that the animals can move around freely in the present system. The disadvantages of the pecking order fights in the group housing system are prevented by feeding all animals at the same time, but separately from each other. By locking all animals or selected individual animals in their feeding stalls, the farmer is enabled to properly check the animals. The feeding stalls can be locked automatically by the mobile feeding station upon command of the computer. Further, the use of a mobile feeding station, which as such is known and used, in stock farming and which according to the invention comprises an electronic identification system, appropriately enables automatic individual feeding by means of a computer.

To provide for further care or treatment of the animal, it is also possible for the mobile feeding station to operate other devices in, or in conjunction with, each of the respective feeding stalls on the basis of identification of the animal present in the feeding stall or to record data coming from such devices.

Measuring data, which may be collected by sensors attached to the animal, for instance a body temperature sensor, can also be transmitted via the mobile feeding station with the identification device coupled thereto.

Apparatus for use in housing animals that is suitable for carrying out the present method is characterized according to the invention in that the mobile feeding station is used for detecting and transmitting measuring data collected by one or more sensors attached to the animal.

BRIEF DESCRIPTION OF THE DRAWING

Hereinafter the invention will be further described with reference to the accompanying diagrammatic drawing of an embodiment relating to pig farming.

DETAILED DESCRIPTION

The feeding system shown comprises three main components: a computer (1), feeding stalls (2) and a (shuttle) feeding station (3).

In the computer the farmer programs the amounts of feed to be furnished to each animal and a sow calendar is kept, partly on the basis of which animals may or may not be isolated (tied up). Any requested data are printed by means of a printer (11). Such computers are known in stock and pig farming. Further, the system comprises a row of feeding stalls (2) each comprising a door (21) with a closing mechanism (22) which is operated by the pig itself and prevents a second pig from trying to gain access to the stall. This closing mechanism (22) comprises a locking device (23) which can be operated centrally or for each feeding stall separately. In the latter case, the locking device is operated by the locking motor (31) which is mounted on the shuttle feeding station (3). Further, the feeding stall (2) contains a feeding trough (24) and a container (25) with a bottom flap (26). The shuttle feeding station (3) comprises a feed hopper (32) and one or more feed dosing units (33), in most cases comprising a motor (34), a jackscrew (35) driven by the motor and a discharge pipe (36).

For the identification of the animals, the feeding station comprises a transmitter/receiver (37) and an antenna (38). The pigs in the feeding stall are fitted with an identification label (50), attached for instance to the ear, and are recognized by the shuttle feeding station when it is located opposite the feeding stall where a pig is present.

The shuttle feeding station (3) is moved along a rail (12) which is mounted at a height of about 2 m in the housing in question. The shuttle feeding station (3) is driven by a transport device (40) comprising some runners (41) mounted on the rails. The drive is effected via a rubber wheel (42) which is driven by a transport motor (43). In this embodiment, the position of the shuttle feeding station is determined by metal position plates (13) mounted on the rail, which are detected by one or more proximity switches (44) mounted on the shuttle feeding station. The transport motor (43), the jackscrew motor(s) (34) and the proximity switch (44) are also connected to the transmitter/receiver (37) which comprises an electronic control device for the shuttle feeding station. This transmitter/receiver is connected to the computer (1) via a cable (14) and a feed transformer (15).

For each group of animals, a plurality of feeding stalls are available, normally the same number as the number of animals in the group. There may be several groups of animals with an associated row of feeding stalls.

The hopper (32) of the shuttle feeding station is replenished by a filling device (16) after each round. The shuttle feeding station is automatically replenished with feed from a feed silo when the shuttle feeding station is in the so-called inactive/filling position.

Hereinafter, the feeding system is further elucidated.

The farmer has indicated in computer (1) the amount of feed each animal is allowed to have, divided into a basic amount of feed for the whole group and an individual amount of feed for each animal. Further, the farmer has indicated for each animal whether it is allowed to leave the feeding stall after feeding or whether it is to be locked in temporarily for an additional check by the farmer. The containers (25) contain a basic amount of feed and the animals move about freely.

When the shuttle feeding station (3) leaves the position of the inactive/filling device (16), an acoustic signal is produced whereupon the animals move to the feeding stalls. For the first group, the locking motor (31) operates a switch (28), whereupon, in this embodiment by means of an air cylinder (29) connected to a rod member (27) which is in turn connected to all bottom flaps (26), all bottom flaps (26) of the containers associated with the first group are simultaneously released and all doors (21) are locked through the closing mechanism (22) and the locking devices (23), whereupon the feed drops into the troughs (24). All animals can now eat simultaneously. The station is now located opposite the first feeding stall and the animal in the stall is recognized via the antenna (38) which is mounted on the shuttle feeding station and connected to the transmitter/receiver. The number of the animal recognized is transmitted to the computer, which in turn reports back what extra amount of feed the animal in question is allowed to have. These data are then transmitted to the transmitter/receiver (37), which in turn causes the jackscrew motors (34) to rotate one or more times, so that additional feed falls into the trough (24) via the container (25). Further, by means of the motor (31) the lock (23) is unlocked. The shuttle feeding station then rides to a next stall where the above-described steps are repeated. If an animal is to be locked in the feeding stall, the locking mechanism (23) is not unlocked. After feeding, the bottom flaps (26) are centrally closed again and a next group can be fed.

When all groups have been fed, it is preferred that all containers (25) are immediately filled again with the basic amount of feed by the feeding station, in preparation for the next feeding round later that same day or the next day.

It is observed that after the foregoing, various modifications will readily occur to anyone skilled in the art. Thus, the feeding station may be designed to be mobile over the floor of the housing. Further, the method is also suitable for other animals than pigs. These and similar modifications are considered to fall within the framework of the invention.

We claim:

1. A method of feeding animals, suitable for unconfined livestock, comprising:
   providing a plurality of feeding stalls having an entrance opening for individual separated animals;
   generating a unique code for each animal by an electronic responder on each animal in an electromagnetic interrogation field;
   storing in a computer data representing each of said animals and identified by each of said unique codes;
   supplying feed to each feeding stall by a feeding station movable to and between said feeding stalls;
   generating said electromagnetic field adjacent each feeding stall by a transmitter/receiver on said feeding station;
   supplying first equal portions of feed to each feeding stall from said movable feeding station;
   identifying a respective animal in each feeding stall by said transmitter/receiver detecting said unique code of a respective responder on said respective animal;
   determining for each animal the amount of a second portion of feed in response to said unique code for each animal detected by said transmitter/receiver at each of said feeding stalls based on said stored data; and
   supplying to each feeding stall said determined amount of said second portion of feed.

2. The method as claimed in claim 1, and further comprising:

providing a separate feed container having open and closed positions for each feeding stall;

depositing said first equal portions of feed to all of said feed containers in said closed position prior to feeding said animals; and supplying said first equal portions of feed from said feed containers in said open position to all of said feeding stalls simultaneously so that said first equal portions of said feed are available to said animals simultaneously.

3. The method as claimed in claim 2, and further comprising:

after supplying said first equal portions of feed to each feeding stall, moving said feeding station to positions at each of said feeding stalls; and supplying said second portions of feed while said feeding station is at each of said feeding stalls.

4. The method as claimed in claim 2, and further comprising:

directly after said supplying of said second portions of feed, closing said feed containers and depositing in said feed containers in said closed position said first equal portions of said feed.

5. The method as claimed in claim 1, and further comprising:

after supplying said first equal portions of feed to each feeding stall, moving said feeding station to positions at each of said feeding stalls; and supplying said second portions of feed while said feeding station is at each of said feeding stalls.

6. The method as claimed in claim 1, and further comprising:

prior to said supplying of said first equal portions of feed to said feeding stalls, producing a signal for attracting said animals to said feeding stalls.

7. The method as claimed in claim 1, and further comprising:

providing a lockable door on each feeding stall for opening and closing said entrance opening thereof; and locking each of said doors after one of said animals has entered a respective one of said feeding stalls and prior to said supplying of said first equal portions of feed.

8. The method as claimed in claim 1, and further comprising:

providing a lockable door on each feeding stall for opening and closing said entrance opening thereof; and locking each of said doors after one of said animals has entered a respective one of said feeding stalls and simultaneously with said supplying of said first equal portions of feed.

9. The method as claimed in claim 1, and further comprising:

attaching at least one sensor to at least one of said animals for measuring data of at least one physical condition thereof; and detecting and transmitting said measured data to said computer.

10. Feeding apparatus for feeding animals, suitable for unconfined livestock, comprising:

electronic responder means associated with each of said animals for generating a unique code for each animal in an electromagnetic interrogation field;

a plurality of feeding stalls, each having an entrance opening for an individual animal;

door means operatively mounted on each of said feeding stalls for opening and closing said entrance opening;

locking means for each feeding stall operatively connected with said door thereof for locking said door in said closed position;

feeding station means movable to positions adjacent to each of said feeding stalls;

transmitter/receiver means mounted on said feeding station means for generating said electromagnet interrogation field adjacent to each feeding stall and identifying an animal present in said feeding stall in response to a respective unique code for each animal;

computer means operatively connected to said transmitter/receiver means containing information relating to individual ones of said animals;

a feed container on each feeding stall for receiving feed supply from said feeding station means;

computer-controllable feed supply means for depositing feed into said containers from said feeding station means;

a movable closing member operatively mounted on each of said feed containers for movement between a closed position for retaining feed therein and an open position for discharging feed in said container to a respective feeding stall on which said container is mounted;

an operating element connected to said closing members so that said closing members are jointly coupled for simultaneous operation so that feed in all of said containers is simultaneously discharged into all of said feeding stalls upon opening of said closing members simultaneously by said operating element; and operating means for operating said operating element.

11. Apparatus as claimed in claim 10, wherein:

said feeding stalls each have a top portion and a bottom portion;

said containers are mounted at said top portions of said feeding stalls;

said closing members each comprise a bottom flap member on each of said containers; and said operating element comprises at least one rod member interconnecting said bottom flap members.

12. The apparatus as claimed in claim 11, and further comprising:

lock operating means on said feeding station for operating said locking means for said doors of said feeding stalls.

13. The apparatus as claimed in claim 11, and further comprising:

a filling apparatus operatively disposed at one position of said moveable feeding station means for filling said feeding station.

14. The apparatus as claimed in claim 11, and further comprising:

a closing mechanism mounted on each of said feeding stalls and operatively connected to the respective door and engageable with a respective animal upon entering the respective feeding stall for closing the respective door to prevent further animals from entering said respective feeding stall.

15. The apparatus as claimed in claim 10, and further comprising:

lock operating means on said feeding station for operating said locking means for said doors of said feeding stalls.

16. The apparatus as claimed in claim 10, and further comprising:
   a filling apparatus operatively disposed at one position of said moveable feeding station for filling said feeding station means.

17. The apparatus as claimed in claim 10, and further comprising:
   at least one sensor means attachable to at least one of said animals for measuring data of at least one physical condition of said at least one animal; and
   an identification device on said feeding station for identifying an animal in a respective feeding stall and for receiving said measured data from said sensor means on said at least one animal in said feeding stall and transmitting said measured data to said computer means.

18. The apparatus as claimed in claim 10, and further comprising:
   a closing mechanism mounted on each of said feeding stalls and operatively connected to the respective door and engageable with a respective animal upon entering the respective feeding stall for closing the respective door to prevent further animals from entering said respective feeding stall.

19. The apparatus as claimed in claim 10, wherein said computer-controlled feed supply means comprises:
   means for depositing in each of said feed containers a first equal portion of feed; and
   means for depositing a second portion of feed in each of said containers in amounts depending upon said unique code for each individual animal.

* * * * *